United States Patent
Wilkinson et al.

(10) Patent No.: US 11,836,658 B2
(45) Date of Patent: Dec. 5, 2023

(54) SYSTEMS AND METHODS FOR ASSESSING DELIVERY VEHICLES

(71) Applicant: Walmart Apollo, LLC, Bentonville, AR (US)

(72) Inventors: Bruce W. Wilkinson, Rogers, AR (US); Todd D. Mattingly, Bentonville, AR (US)

(73) Assignee: WALMART APOLLO, LLC, Bentonville, AR (US)

( * ) Notice: Subject to any disclaimer, the term of this patent is extended or adjusted under 35 U.S.C. 154(b) by 437 days.

(21) Appl. No.: 15/843,857

(22) Filed: Dec. 15, 2017

(65) Prior Publication Data

US 2018/0174087 A1 Jun. 21, 2018

Related U.S. Application Data

(60) Provisional application No. 62/435,225, filed on Dec. 16, 2016.

(51) Int. Cl.
*G06Q 10/083* (2023.01)
*G06Q 30/0601* (2023.01)
*G06Q 10/0631* (2023.01)

(52) U.S. Cl.
CPC . *G06Q 10/06313* (2013.01); *G06Q 10/06314* (2013.01); *G06Q 10/083* (2013.01); *G06Q 30/0635* (2013.01)

(58) Field of Classification Search
None
See application file for complete search history.

(56) References Cited

U.S. PATENT DOCUMENTS 6,195,005 B1  2/2001  Maloney
6,240,362 B1  5/2001  Gaspard, II
(Continued)

FOREIGN PATENT DOCUMENTS

DE  10331356      2/2005
JP  2004307210   11/2004
(Continued)

OTHER PUBLICATIONS

Barr et al. "Exclusive: Wal-Mart May Get Customers to Deliver Packages to Online Buyers." Archived by the Wayback Machine on Mar. 28, 2013, Retrieved from {URL: https://web.archive.org/web/20130328231653/https://www.reuters.com/article/2013/03/28/us-retail-walmart-delivery-idUSBRE92R03820130328}. (Year: 2013).*

(Continued)

*Primary Examiner* — Susanna M. Diaz
(74) *Attorney, Agent, or Firm* — Fitch, Even, Tabin & Flannery LLP

(57) ABSTRACT

In some embodiments, systems and methods are provided herein useful to assess or determine available cargo capacity for multiple commercial product delivery vehicles ("delivery vehicles"). In some embodiments, systems are provided to assess delivery vehicles and may include multiple electronic user devices each having a delivery agent interface operating thereon and an association with one or more delivery agents. At least one control circuit is communicatively coupled to the electronic user devices. By one approach, the control circuit may estimate delivery requirements for purchased orders, which includes volume requirements and geometric configurations of purchased orders. The control circuits may evaluate delivery vehicles, utilizing cargo space sensor data, to determine which are suitable for the purchased order by comparing delivery requirements with the available vehicular cargo spaces, and present, to the (Continued)

appropriate electronic user devices, an opportunity to deliver at least a portion of the purchased order to a delivery location.

17 Claims, 5 Drawing Sheets

(56) References Cited

U.S. PATENT DOCUMENTS

| | | | |
|---|---|---|---|
| 6,253,129 | B1 | 6/2001 | Jenkins |
| 6,385,537 | B2 | 5/2002 | Gaspard, II |
| 6,411,897 | B1 | 6/2002 | Gaspard, II |
| 6,806,807 | B2 | 10/2004 | Cayne |
| 7,113,071 | B2 | 9/2006 | Cayne |
| 7,257,552 | B1 | 8/2007 | Franco |
| 7,339,469 | B2 | 3/2008 | Braun |
| 7,840,427 | B2 | 11/2010 | O'Sullivan |
| 7,945,469 | B2 | 5/2011 | Cohen |
| 7,945,470 | B1 | 5/2011 | Cohen |
| 8,160,972 | B1 | 4/2012 | Tannenbaum |
| 8,195,496 | B2 | 6/2012 | Gottlieb |
| 8,554,694 | B1 | 10/2013 | Ward |
| 8,560,461 | B1 | 10/2013 | Tian |
| 8,626,540 | B2 | 1/2014 | Peterkofsky |
| 9,066,206 | B2 | 6/2015 | Lin |
| 9,202,191 | B2 | 12/2015 | Bowen |
| 9,230,292 | B2 | 1/2016 | Amin |
| 9,230,372 | B2 | 1/2016 | Kadaba |
| 9,242,810 | B2 | 1/2016 | Lossov |
| 9,269,103 | B1 | 2/2016 | Kumar |
| 9,305,310 | B2 | 4/2016 | Radhakrishnan |
| 9,378,479 | B2 | 6/2016 | Seifen |
| 9,459,622 | B2 | 10/2016 | Abhyanker |
| 9,460,524 | B1* | 10/2016 | Curlander ............... G01F 22/00 |
| 9,639,908 | B1 | 5/2017 | Reiss |
| 9,718,397 | B2 | 8/2017 | Kalanick |
| 9,721,224 | B2 | 8/2017 | Waris |
| 9,778,057 | B2 | 10/2017 | O'Mahony |
| 9,792,574 | B2 | 10/2017 | Lord |
| 9,805,536 | B2 | 10/2017 | Lutnick |
| 9,811,838 | B1 | 11/2017 | Daire |
| 9,852,551 | B2 | 12/2017 | Brinig |
| 9,902,310 | B2 | 2/2018 | Fournier |
| 9,904,900 | B2 | 2/2018 | Cao |
| 9,928,540 | B1 | 3/2018 | Gerard |
| 9,934,530 | B1 | 4/2018 | Iacono |
| 10,133,995 | B1* | 11/2018 | Reiss ............. G06Q 10/063114 |
| 2002/0019759 | A1 | 2/2002 | Arunapuram |
| 2003/0040944 | A1 | 2/2003 | Hileman |
| 2003/0046173 | A1 | 3/2003 | Benjier |
| 2004/0015393 | A1 | 1/2004 | Fong |
| 2004/0069850 | A1* | 4/2004 | De Wilde ........ G06K 19/07758 235/385 |
| 2004/0075557 | A1 | 4/2004 | Selwyn |
| 2004/0236635 | A1* | 11/2004 | Publicover ......... G06Q 10/0832 705/26.81 |
| 2006/0026030 | A1 | 2/2006 | Jacobs |
| 2006/0232412 | A1 | 10/2006 | Tabacman |
| 2007/0112647 | A1 | 5/2007 | Borders |
| 2007/0185598 | A1 | 8/2007 | Ortega |
| 2007/0192111 | A1 | 8/2007 | Chasen |
| 2008/0183526 | A1 | 7/2008 | Hancock |
| 2008/0189146 | A1* | 8/2008 | Salloum ................... G08G 1/20 705/6 |
| 2009/0326808 | A1* | 12/2009 | Blanton ................. G06Q 10/08 701/408 |
| 2011/0059693 | A1 | 3/2011 | O'Sullivan |
| 2012/0030133 | A1 | 2/2012 | Rademaker |
| 2013/0144428 | A1 | 6/2013 | Irwin |
| 2014/0025524 | A1* | 1/2014 | Sims ................. G06Q 30/0639 705/330 |
| 2014/0058902 | A1 | 2/2014 | Taylor |
| 2014/0164126 | A1 | 6/2014 | Nicholas |
| 2014/0229258 | A1 | 8/2014 | Seriani |
| 2014/0236856 | A1 | 8/2014 | Baykhurazov |
| 2014/0278634 | A1 | 9/2014 | Horvitz |
| 2014/0278851 | A1 | 9/2014 | Kopanati |
| 2014/0278875 | A1 | 9/2014 | Ganesh |
| 2014/0330428 | A1 | 11/2014 | Wolfe |
| 2015/0046298 | A1 | 2/2015 | Zwakhals |
| 2015/0081360 | A1 | 3/2015 | Sun |
| 2015/0081581 | A1 | 3/2015 | Gishen |
| 2015/0094876 | A1 | 4/2015 | Baldwin |
| 2015/0106292 | A1 | 4/2015 | Robinson |
| 2015/0161563 | A1 | 6/2015 | Mehrabi |
| 2015/0199632 | A1 | 7/2015 | Chander |
| 2015/0206093 | A1 | 7/2015 | Trew |
| 2015/0227890 | A1 | 8/2015 | Bednarek |
| 2015/0242829 | A1 | 8/2015 | Bhaskaran |
| 2015/0310388 | A1 | 10/2015 | Jamthe |
| 2015/0339625 | A1 | 11/2015 | Agasti |
| 2015/0347961 | A1 | 12/2015 | Gillen |
| 2015/0348173 | A1 | 12/2015 | Gillen |
| 2015/0363843 | A1 | 12/2015 | Loppatto |
| 2016/0012391 | A1 | 1/2016 | Burnett |
| 2016/0019669 | A1 | 1/2016 | Gopalakrishnan |
| 2016/0048804 | A1 | 2/2016 | Paul |
| 2016/0071056 | A1 | 3/2016 | Ellison |
| 2016/0078394 | A1 | 3/2016 | Fuldner |
| 2016/0086128 | A1 | 3/2016 | Geiger |
| 2016/0096508 | A1 | 4/2016 | Oz |
| 2016/0104112 | A1 | 4/2016 | Gorlin |
| 2016/0104113 | A1 | 4/2016 | Gorlin |
| 2016/0155072 | A1 | 6/2016 | Prodromidis |
| 2016/0180274 | A1* | 6/2016 | Zwakhals ............ G06Q 10/087 705/7.25 |
| 2016/0189098 | A1 | 6/2016 | Beaurepaire |
| 2016/0195404 | A1 | 7/2016 | Prasad |
| 2016/0210591 | A1* | 7/2016 | Lafrance ............. G06Q 10/047 |
| 2016/0225115 | A1 | 8/2016 | Levy |
| 2016/0282466 | A1 | 9/2016 | Epler |
| 2016/0328678 | A1 | 11/2016 | Gillen |
| 2016/0350701 | A1* | 12/2016 | Brehm ................. G05D 1/0297 |
| 2016/0364678 | A1 | 12/2016 | Cao |
| 2016/0364679 | A1 | 12/2016 | Cao |
| 2016/0364812 | A1 | 12/2016 | Cao |
| 2016/0364823 | A1* | 12/2016 | Cao ........................ G06Q 50/30 |
| 2016/0379167 | A1 | 12/2016 | Raman |
| 2017/0032341 | A1 | 2/2017 | Johnsrud |
| 2017/0083862 | A1* | 3/2017 | Loubriel ............ G06Q 10/0835 |
| 2017/0089710 | A1 | 3/2017 | Slusar |
| 2017/0091891 | A1 | 3/2017 | Van Der Berg |
| 2017/0124510 | A1 | 5/2017 | Caterino |
| 2017/0140326 | A1 | 5/2017 | Rhyu |
| 2017/0220966 | A1 | 8/2017 | Wang |
| 2017/0236088 | A1 | 8/2017 | Rao |
| 2017/0300936 | A1 | 10/2017 | Wilkinson |
| 2017/0310770 | A1 | 10/2017 | Samaan |
| 2017/0351994 | A1 | 12/2017 | Waris |
| 2018/0096414 | A1 | 4/2018 | Iacono |
| 2018/0174262 | A1 | 6/2018 | Wilkinson |
| 2018/0181904 | A1 | 6/2018 | Wilkinson |
| 2018/0365638 | A1 | 12/2018 | Chen |
| 2019/0066251 | A1 | 2/2019 | Samocha |

FOREIGN PATENT DOCUMENTS

| | | |
|---|---|---|
| WO | 2000008287 | 2/2000 |
| WO | 2001075746 | 10/2001 |
| WO | 2015084688 | 6/2015 |
| WO | 2018112303 A1 | 6/2018 |

OTHER PUBLICATIONS

Devari, Aashwinikumar. "Crowdsourced Last Mile Delivery Using Social Networks." Retrieved from {URL: https://www.acsu.buffalo.edu/~qinghe/thesis/2016-01%20Aashwin%20MS%20Order%20Fulfillment.pdf}. (Year: ????).*

Van Woensel, Tom. "The Neighbour Brings Your Groceries." Dec. 28, 2013. Retrieved from {URL: https://tomvanwoensel.com/2013/12/28/crowd-logistics/}. (Year: 2013).*

(56) References Cited

OTHER PUBLICATIONS

USPTO; U.S. Appl. No. 15/843,817; Office Action dated May 19, 2020, (pp. 1-33).
PCT; App. No. PCT/US2017/068400; International Search Report and Written Opinon dated Mar. 29, 2018.
USPTO; U.S. Appl. No. 15/854,651; Office Action dated Apr. 8, 2021; (pp. 1-42).
USPTO; U.S. Appl. No. 15/854,641; Office Action dated Jun. 16, 2020, (pp. 1-37).
USPTO; U.S. Appl. No. 15/854,651; Office Action dated Aug. 25, 2021; (pp. 1-44).
USPTO; U.S. Appl. No. 15/854,651; Office Action dated Dec. 23, 2019; (pp. 1-39).
USPTO; U.S. Appl. No. 15/843,817; Office Action dated Dec. 20, 2019; (pp. 1-25).
U.S. Appl. No. 15/843,817, filed Dec. 15, 2017, Bruce W. Wilkinson.
PCT; App. No. PCT/US2017/066589; International Search Report and Written Opinion dated Mar. 7, 2018.
PCT; App. No. PCT/US2017/066593; International Search Report and Written Opinion dated Mar. 8, 2018.
USPTO; U.S. Appl. No. 15/854,651; Final Rejection dated Jun. 28, 2022; (pp. 1-49).
USPTO; U.S. Appl. No. 15/854,651; Non-Final Rejection dated Dec. 17, 2021; (pp. 1-43).

\* cited by examiner

FIG. 3    300

SYSTEMS AND METHODS FOR ASSESSING DELIVERY VEHICLES

RELATED APPLICATION(S)

This application claims the benefit of U.S. Provisional application No. 62/435,225, filed Dec. 16, 2016, which is incorporated by reference in its entirety herein.

TECHNICAL FIELD

This invention relates generally to assessing delivery vehicles and determining cargo capacity thereof.

BACKGROUND

A typical delivery service can utilize a fleet of commercial vehicles to transport commercial products to delivery destinations. Commercial vehicles can include vans and trucks, which in one illustrative approach move commercial products between hubs and spokes. For example, "last mile" delivery typically includes transportation from spoke endpoints to delivery destinations (e.g., homes and businesses) or from store fronts to delivery destinations.

BRIEF DESCRIPTION OF THE DRAWINGS

Disclosed herein are embodiments of systems and methods pertaining to assessing delivery vehicles. This description includes drawings, wherein.

Figure 1:
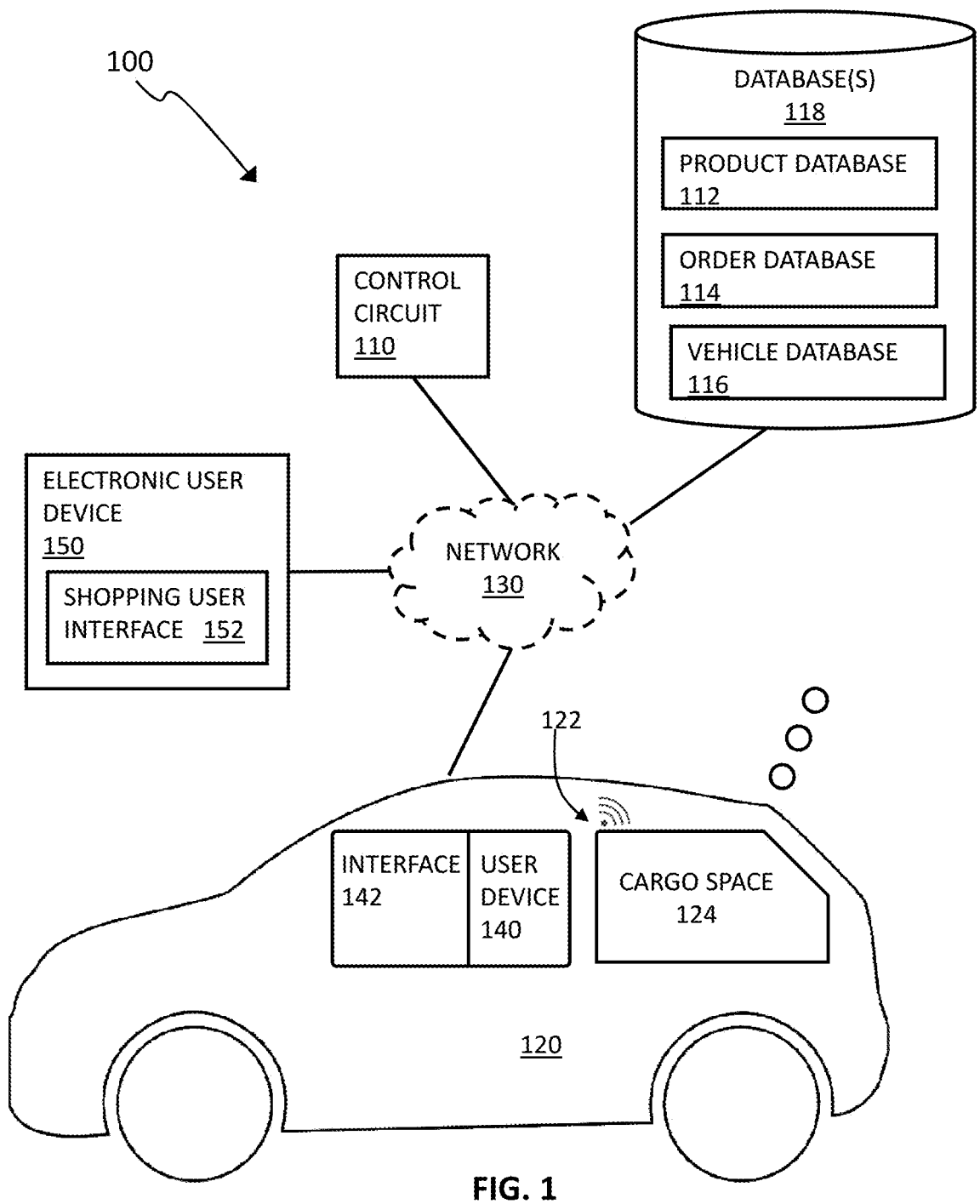
FIG. 1 illustrates a simplified block diagram of a system to assess cargo capacity for multiple vehicles, in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems and methods are provided herein useful to assess vehicle capacity such as by determining available cargo capacity for multiple commercial product delivery vehicles. In some embodiments, systems are provided to determine available cargo capacity for multiple commercial product delivery vehicles, and include vehicle cargo space sensors positioned proximate to cargo spaces of registered delivery commercial product vehicles. In one illustrative approach, each registered commercial product delivery vehicle includes at least one cargo space with one or more vehicle cargo space sensors associated therewith that are configured to monitor available cargo space within the commercial product delivery vehicle. In certain embodiments, the vehicle cargo space sensors are configured to emit and capture wireless signals to monitor available cargo spaces. In one exemplary embodiment, at least one database is communicatively coupled to the vehicle cargo space sensor and has a plurality of purchase orders that each include at least one product having at least one product attribute associated therewith. Further, in some configurations, the database(s) is configured to receive and store vehicle cargo space sensor data.

As used herein, delivery agent or delivery user interfaces are configured to operate on electronic user devices associated with the delivery agents, users or vehicle drivers. The user interfaces described herein, including the delivery agent interface, may be provided to the electronic user by the control circuit or may be executed by the electronic user device when in communication with the control circuit. In one embodiment, one or more control circuits are communicatively coupled to the database, the delivery agent interfaces, and the vehicle cargo space sensors. The control circuit(s) receive registration information from delivery agents via the delivery agent interfaces. The control circuits can use vehicle cargo space sensor data to select registered commercial product delivery vehicles that have a desired available cargo space for delivery of one or more purchased orders. The control circuits can use the delivery agent interfaces to present one or more delivery opportunities to the delivery agents of the selected registered commercial product delivery vehicles. As used herein, the registered commercial product delivery vehicles may be non-commercial vehicles and the registration information received from the delivery agent interface may include at least one of vehicle make and vehicle model. With this information, the control circuit, by one approach, is configured to compare the available cargo space with the manufacturer supplied cargo capacity ratings based on the registration information received from the delivery agent.

In addition to non-commercial vehicles, in one illustrative embodiment, at least some of the commercial product delivery vehicles are crowd-sourced via a plurality of separate and distinct delivery agents having delivery agent interfaces operating on the plurality of electronic user devices.

In operation, the vehicle capacity sensors may emit and capture a wireless signal(s) to monitor the available cargo space within commercial product delivery vehicles. For example, each vehicle capacity sensor may generate data, such as, for example, having at least one of point cloud data, time of flight data, or triangulation data, with which the control circuit may use to determine available cargo space within the commercial product delivery vehicle.

Different products may require different delivery conditions. For example, cooled or chilled items may need to be transported in a temperature-controlled compartment, such as a freezer compartment or a vehicle with air conditioning. Accordingly, the control circuit may receive information, via the delivery agent interface and/or the vehicle cargo space sensors, regarding the vehicle capabilities. Further, the control circuit, in some embodiments, may select a cargo space with storage conditions that are compatible with the products in a purchase order or a portion thereof.

In addition to delivery conditions, such as temperature or humidity, the purchase orders and the items therein also typically require a certain amount of space for a given order, product, or item. Accordingly, the control circuit, in one illustrative approach, analyzes the product or items within a purchase order to determine the required space, conditions, and/or geometric (i.e., physical) configuration required of the cargo space or delivery vehicle for the purchase order. To that end, the control circuit, in one configuration, estimates delivery requirements for purchase orders by accessing or referencing the database to determine at least one of weight, volumetric, and/or geometric configuration of one or more products in the purchase order.

Further, by one approach, the system includes environmental sensors in proximity to the cargo spaces. These environmental sensors, which may be in communication with the control circuit and/or the delivery agent interface, are configured to generate environmental data associated with the cargo spaces, such as, for example, temperature and humidity readings.

Based on the information received, the control circuit is configured to compare the desired available cargo space with the dimensions of one or more products in a purchase order and determine an optimized storage orientation for the one or more products in the purchase order. This can be based, in part, on available cargo spaces and/or the products within the order. For example, a particularly heavy item may be slated for storage below lighter or more delicate products.

In some embodiments, methods are provided for determining available cargo capacity for multiple commercial product delivery vehicles. Some of these methods receive registration information from one or more delivery agents via one or more delivery agent interfaces. Purchased orders may be received from customers and at least some of the orders typically include products requiring delivery thereof. The registered delivery vehicles may be monitored via vehicle cargo space sensors positioned proximate to the cargo spaces and configured to emit and capture wireless signals to monitor the available or unoccupied cargo space within the commercial product delivery vehicles. Registered commercial product delivery vehicles that have available cargo space compatible with the commercial products may be selected. A delivery opportunity may then be presented to delivery users of the selected registered commercial product delivery vehicles.

In yet another illustrative embodiment, a system for determining alternative commercial product delivery vehicles may include a delivery agent interface configured to operate on an electronic user device associated with a delivery agent and a control circuit in communication with a plurality of electronic user devices. By one approach, the control circuit is configured to estimate delivery requirements for a purchased order (such as volumetric and geometric configuration as determined by the items in the purchased order), evaluate a plurality of commercial product delivery vehicles to find one or more suitable commercial product delivery vehicles by comparing the delivery requirements with unoccupied vehicular cargo space and at least one of customer preferences and/or availability of commercial product delivery vehicles, and present, via the electronic user devices associated with the one or more suitable commercial product delivery vehicles, a delivery opportunity to the associated delivery agent to deliver at least a portion of the purchased order to a delivery location. Such a system also may include cargo space sensors (which may be communicatively coupled to the control circuit and/or the electronic user device of the delivery agent interface) to determine vehicular cargo space availability.

By one approach, the vehicle cargo space sensors include an image capturing device to capture images of the vehicular cargo space. The captured images may be communicated to the control circuit, which may be configured to analyze the captured images of the vehicular cargo space.

As noted above, the control circuit may evaluate delivery vehicles via one or more customer preferences and availability (current and future). By one approach, the customer preferences may include at least one of cost preferences, vehicle preferences, delivery schedule preferences, willingness to split the purchased order into multiple deliveries and environmental impact preferences, among others.

In addition to the cargo space sensor, the system also may include one or more vehicle location sensors (associated with the delivery vehicles) that are in communication with the control circuit. As used herein, the vehicle location sensor is configured to report a location of a particular commercial product delivery vehicle associated with the vehicle location sensor substantially in real-time.

The purchased order typically includes a list of all products in the order (i.e., all purchased products). Further, the system may include a product database indicating product attributes, such as, for example, weight and size, of the commercial products that the control circuit may access to evaluate the delivery requirements for the items in the purchased order. More particularly, the product database of product attributes may be used by the control circuit to estimate the delivery requirements to determine a weight, volume, and/or geometric configuration requirements of the purchased items. In addition to a product database, the system may also include an order database having a plurality of purchased orders stored therein.

As noted above, the commercial product delivery vehicles used herein may be crowd-sourced. Further, the system may evaluate a preferred commercial product delivery vehicle before considering other options, such as crowd-sourced commercial product delivery vehicles. For example, the system may evaluate a cargo area of a primary commercial product delivery vehicle and upon determination that the cargo area of the primary commercial product delivery vehicle is unsuitable for delivery of an entire purchase order, the system may evaluate a secondary cargo area of a secondary commercial product delivery vehicle. In addition, upon a determination that the secondary cargo area is suitable for delivery of the entire purchase order, the control circuit, in one configuration, is configured to present the delivery opportunity to the secondary commercial product delivery vehicle via the delivery agent interface. In another aspect, upon a determination that the secondary cargo area is suitable for delivery of the purchased order in combination with the cargo area of the primary commercial product delivery vehicle, the control circuit in another approach is configured to present multiple delivery opportunities, one for each of the primary and secondary commercial product delivery vehicles. Accordingly, the control circuit is configured to split purchased orders, in addition to cancel or reschedule the order if a customer elects not to utilize a particular commercial product delivery vehicle.

From the customer's perspective, a shopping system may include a shopping user interface configured to operate on an electronic user device of a customer and a control circuit in communication with the electronic user device. In one illustrative configuration, the control circuit is configured to estimate delivery requirements for a purchased order (such as volume and geometric configuration as determined by the items in the purchased order), evaluate a plurality of commercial product delivery vehicles to find one or more suitable commercial product delivery vehicles by comparing the delivery requirements with vehicular cargo space available for particular commercial product delivery vehicles, and present, via the electronic user device of the customer, a delivery option to the customer indicating based, in part, upon customer preferences and availability of the suitable commercial product delivery vehicles.

By one approach, the control circuit is configured to present multiple delivery options to the customer via the shopping user interface. By another approach, the control circuit is configured to receive a requested delivery time and update the delivery option(s) presented to the customer via the electronic user device.

In yet another configuration a shopping system includes a delivery agent interface configured to operate on an electronic user device associated with a delivery agent, an order database having a plurality of purchased orders stored therein, and a control circuit in communication with a plurality of electronic user devices and the order database. In one approach, the control circuit is configured to estimate delivery requirements for a purchased order (such as volumetric and geometric configuration as determined by the items in the purchased order), query a plurality of commercial product delivery vehicles to determine the unoccupied cargo space for each of the plurality of commercial product delivery vehicles and compare the delivery requirements with the unoccupied cargo of particular commercial product delivery vehicles and the delivery requirements of at least one of the purchased orders in the order database, and present, via the electronic user device associated with the one or more suitable commercial product delivery vehicles, a delivery opportunity to deliver at least a portion of the purchased order to a delivery location.

In one approach, a method for delivering purchased items includes assessing delivery requirements of a purchased order (such as volumetric and geometric configuration as determined by the items in the purchased order) that is designated for delivery to a customer from a physical retail facility, evaluating a plurality of commercial product delivery vehicles by comparing the delivery requirements of the purchased order with vehicular cargo space available for each of the plurality of commercial product delivery vehicles to determine whether one of the plurality of commercial product delivery vehicles has suitable cargo space available for the purchased order, comparing the commercial product delivery vehicles with customer preferences to determine whether a particular one of the commercial product delivery vehicles is suitable for delivery of the purchased order, (the customer preferences including at least one of cost preferences, vehicle preferences, delivery schedule preferences, willingness to split the purchased order into multiple deliveries, and environmental impact preferences), and presenting a delivery opportunity to a vehicle driver or a delivery option to the customer, via a user interface.

By one approach, the method also may include querying the plurality of commercial product delivery vehicles to request information on the available cargo space and/or receiving the available cargo space from the plurality of commercial product delivery vehicles. By another approach, the method may include cancelling, rescheduling, or splitting the purchased order if the customer elects not select the delivery option presented.

FIG. 1 illustrates a simplified block diagram of a system 100 to determine available cargo capacity for multiple vehicles, in accordance with an embodiment of the present invention. System 100 can comprise one or more delivery vehicles 120, electronic user devices 140 for use by delivery agents, electronic user devices 150 for use by shoppers, and control circuits 110 configured to communicate over a computer and/or one or more communication networks 130. Network 130 can be, for example, a local area network (LAN), a wide area network (WAN) such as the Internet, or a combination of the two, and includes wired, wireless, or fiber optic connections. In general, network 130 can be any combination of connections and protocols that can support communications between delivery vehicles 120, electronic user devices 140, electronic user devices 150, and the control circuits 110, in accordance with some embodiments.

The electronic user devices 140 and the electronic user devices 150 can each be a desktop computer, a laptop computer, a thin client, a server, a cluster computer, a smart TV, an in-vehicle computing device, a wearable computing device, a mobile device (e.g., smart phones, phablets, tablets, and similar devices) or similar devices, among others. Electronic user devices 140 and electronic user devices 150 can each include one or more input/output devices that facilitate user interaction with the device (e.g., displays, speakers, microphones, keyboards, mice, touch screens, joysticks, dongles, pointing devices, game pads, cameras, gesture-based input devices, and similar I/O devices). As illustrated the delivery user interface 142, which may be operated at one or more electronic user devices 140, may be communicatively coupled over one or more distributed communication networks such as network 130. By one approach, an electronic user device 140 may be associated with one or more delivery vehicles 120 and/or one or more delivery agents.

Delivery agent interface 142 includes software that can facilitate the crowdsourcing of delivery vehicles 120 for the delivery of commercial products. Delivery agent interface 142, for example, can include one or more graphical icons, visual indicators, and/or command-line indicators that allow delivery users to interact with the delivery user interface 142. Delivery users or agents can be persons that own, rent, lease, and/or operate one or more delivery vehicles 120 and desire to provide delivery services via the delivery vehicles 120, in accordance with some embodiments. Delivery agents can interact with the delivery agent interfaces 142 via manipulation of the electronic user device 140, such as, for example, by manipulating graphical icons and/or visual indicators displayed on the electronic user device. Additionally, or alternatively, delivery users can interact with the delivery user interfaces 142 by issuing one or more commands into the command-line interfaces.

Delivery users can use the delivery agent interfaces 142 to submit registration data associated with the delivery vehicles 120 to the control circuits 110. For example, the registration data can include vehicle-related information (e.g., make, model, year, service history, vehicle identification number, vehicle availability, and similar vehicle-related information), driver-related information (e.g., age, license number, driving record, driver availability, and similar driver-related information), account information, and/or payment information, among other data.

As used herein, the delivery vehicles 120 are mobile machines that can be configured to transport people, commercial products, or a combination thereof, among others. Delivery vehicles 120, for example, can traverse environments via the use of a terrestrial propulsion system, aerial propulsion system, aquatic propulsion system, similar propulsion systems, or a combination of two or more of the aforementioned propulsion systems. Delivery vehicles 120, in certain instances, can be one or more terrestrial vehicles (e.g., wagons, cars, motorcycles, trucks, buses, tractor trailers, tanks, tracked vehicles, trains, trams, and similar vehicles), aerial vehicles (e.g., airplanes, helicopters, aerial drones, tilt-wing aircrafts, and similar vehicles), aquatic vehicles (e.g., ships, boats, hovercrafts, submarines, and similar vehicles), similar vehicles, or a combination of two or more thereof. Delivery vehicles 120 can be powered by gasoline, electricity, hydrogen, solar energy, similar energy sources, or a combination of two or more of the aforementioned energy sources, among others. In certain embodiments, delivery vehicles 120 are non-commercial vehicles that may be operated by separate and distinct delivery agents.

In one embodiment, the delivery vehicles 120 may be driven by the delivery agents in the vehicles. In another embodiment, the delivery vehicles 120 can navigate an environment autonomously, semi-autonomously, via human intervention, or a combination of two or more of the aforementioned navigational methods. Delivery vehicles 120, in certain embodiments, can have one or more container or cargo spaces 124, which are three-dimensional volumes configured to store and/or transport one or more persons, objects, or a combination of two or more thereof. The container or cargo spaces 124 may be trunk spaces, cabin spaces, glove compartments, storage areas, or similar spaces within delivery vehicles 120 capable of storing commercial products for transportation to delivery destinations. In certain embodiments, cargo spaces 124 can comprise climate control capabilities (e.g., temperature, humidity, and/or pressure control). In certain aspects, container or cargo spaces 124 can each include one or more vehicle cargo space sensors 122 positioned proximate to a surface thereof. By one approach, the vehicle cargo space sensors 122 are configured to assess or detect the available cargo space 124 (i.e., the cargo space which is not occupied) within a delivery vehicle 120. With this information, the control circuit 110 can ascertain the currently available cargo space and, the cargo space typically available in the delivery vehicle 120 and/or the manufacturer supplied cargo space or cargo capacity, if the necessary information was provided when the delivery vehicle 120 was registered with the system.

In some embodiments, the vehicle cargo space sensors 122 can include devices that can capture spatial data (e.g., length, width, height, volume, volumetric configuration, similar spatial data, or a combination of two or more thereof) associated with cargo spaces 124. By one approach, the vehicle cargo space sensors 122 further include environmental sensors that capture climatic data (e.g., temperature, humidity, barometric pressure, similar climatic data, and/or a combination of two or more thereof) associated with cargo spaces 124. Additionally, or alternatively, the vehicle cargo space sensors 122 can comprise geolocation sensors that can capture geolocation data associated with the instant location of the delivery vehicles 120. In certain embodiments, the vehicle cargo space sensors 122 can include one or more three-dimensional cameras, laser rangefinders, time-of-flight cameras, humidity sensors, temperature sensors, pressure sensors, similar devices, and/or a combination of two or more of the aforementioned devices. In certain aspects, the vehicle cargo space sensors 122 can generate point cloud data, time of flight data, triangulation data, as well as similar spatial data to determine volume, volumetric configuration, length, width, and/or height of cargo spaces 124. For example, one or more vehicle cargo space sensors 122 can be positioned within cargo space 124 and configured to generate time of flight ("TOF") data by emitting and capturing one or more signals (e.g., electromagnetic, acoustic, light, similar wireless signals, or a combination of two or more thereof) within the cargo space 124 at one or more angles to capture spatial data associated with the cargo space 124.

Figure 2:
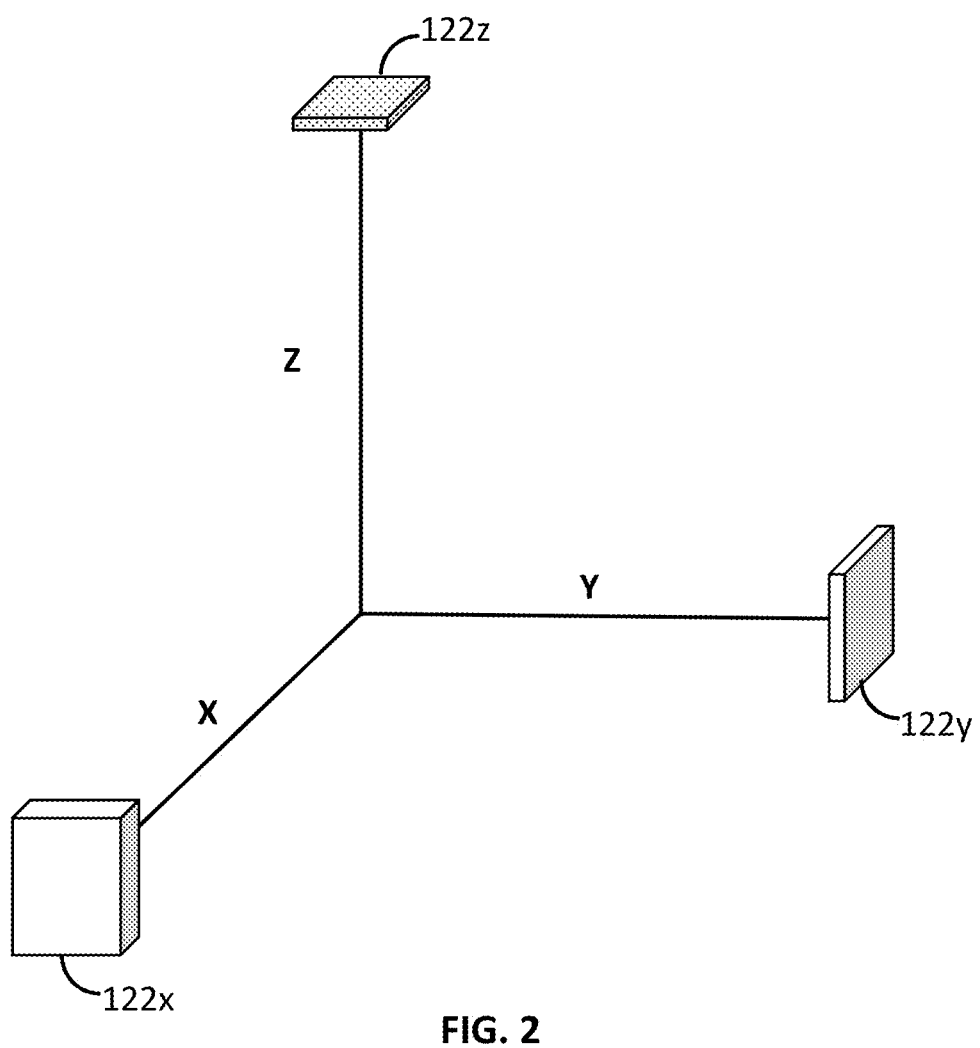
FIG. 2 illustrates sensor positioning for assessing cargo capacity for multiple vehicles, in accordance with several embodiments.

Multiple copies of the vehicle cargo space sensors 122 may be positioned proximate to surfaces of cargo space 124 in a manner to facilitate an increase in measurement accuracy. For example, FIG. 2 illustrates three vehicle cargo space sensors 122$x$, 122$y$, and 122$z$ each positioned within a cargo space 124 in a manner that corresponds to the X, Y, and Z spatial planes. The aforementioned multi-angular approach can improve the accuracy of available cargo space determinations (discussed below) by capturing spatial data from different angles. The vehicle cargo space sensors 122 may be permanently or temporarily positioned proximate to surfaces of cargo space 124. The vehicle cargo space sensors 122, in certain embodiments, may be standalone devices that are temporarily placed within cargo space 124 to generate sensor data. In other embodiments, the vehicle cargo space sensors 122 can be integrated into one or more surfaces of cargo space 124. As used herein, the vehicle cargo space sensors 122 can generate sensor data, for example, periodically, continuously, upon receiving instructions, or a combination of two or more thereof.

In certain embodiments, the vehicle cargo space sensors 122 transmit, such as via network 130, to vehicle database 116. Alternatively, or additionally, the vehicle cargo space sensors 122 transmit, such as via network 130 or a wired or wireless connection, sensor data to electronic user device 140, which also may transmit the data via network 130.

In another aspects, an electronic user device 150 (which may be different, similar or the same as electronic user device 140) can comprise the shopping user interface 152, which may include software utilized by one or more shopping users (i.e., customer) to purchase or order commercial products and arrange delivery of purchased orders, in accordance with some embodiments. For example, shopping users may be persons that purchase commercial products from one or more physical retail facilities that desire to have the purchased commercial products delivered to predetermined delivery destinations, in accordance to some embodiments.

Shopping users can, via the shopping user interface 152, browse or search for commercial products, or access one or more list of commercial products that are available for purchase (e.g., included in product database 112 discussed below). In addition, the shopping user interface 152 may permit the shopper to arrange for the purchase of one or more commercial products and transmit the generated purchased orders to the computing device or control circuit 110. Additionally, or alternatively, one or more commercial products may be purchased at a physical retail facility. For example, the shopping users can, via the shopping user interfaces 152, arrange delivery of purchased commercial products associated with purchased orders. In one illustrative approach, the customer or shopping user may generate one or more customer preferences (e.g., delivery cost preferences, vehicle preferences, delivery time, timeline preferences, and willingness to split purchased orders into multiple deliveries) and transmit the generated customer preferences to the control circuit 110. In certain embodiments, shopping users, via the shopping user interface 152, can receive delivery options generated by the control circuits 110 (discussed below) that are based, in part, on their customer preferences, the availability of suitable delivery vehicles 120 (discussed further below), or a combination of the two.

For example, shopping user interfaces 152 can also present delivery options to customers or shopping users via one or more of the aforementioned I/O devices associated with electronic user devices 150. The customers or shopping users can select delivery options by direct manipulation of the graphical icons and/or visual indicators that may be presented by the shopping user interfaces 152. Additionally, or alternatively, the shopping users can select delivery options by issuing commands into the command-line interfaces that can be presented by the shopping user interfaces 152. In some embodiments, shopping user interfaces 152 may be provided to the electronic user devices 150 by the control circuit 110.

By one approach, the control circuit 110 is utilized to determine available cargo capacity for multiple delivery vehicles 120. The control circuit 110 can comprise one or more control circuits communicatively coupled to one or more databases 118. The databases 118 can be an information repository with program files and data files. By one approach, the files can comprise sensor data generated by the vehicle cargo space sensors 122 (e.g. spatial data, geolocation data, and/or climatic data discussed above) that is associated with cargo spaces 124. The files can comprise registration data associated with delivery vehicles 120 received from delivery user interfaces 142 (discussed above). By one approach, the databases 118 include an order database 114 having a plurality of purchased orders stored therein. Further, the order database 114 may also include delivery requirements, product attributes (e.g., weights, volume requirements, geometric configurations of purchased items, similar data, or a combination of two or more thereof), customer preferences, and/or delivery vehicles 120 availability lists. By yet another approach, the databases 118 includes a product database 112 of product attributes, which may include at least one of a weight, a volume, and a geometric configuration of one or more products. In this illustrative configuration, some of the information mentioned above that might be found within the order database 114 may be alternatively (or additionally) stored in a separate order database 114.

As shown in FIG. 1, the system 100 also includes a vehicle database 116, which may be in communication with a plurality of vehicle cargo space sensors 122, and stores vehicle information, such as available or unoccupied cargo space, vehicle make, vehicle model, vehicle availability, and/or manufacturer supplied information for the delivery vehicles 120 associated with registration data (e.g., axle number, cargo capacity ratings, theoretical spatial data of cargo space 124, similar standard information, or a combination of two or more of thereof), among other vehicle details. In one illustrative approach, the system 100, such as via the control circuit(s) 110, may access one or more external databases and retrieve manufacturer supplied information that is associated with registration data received from delivery user interfaces 142.

By one approach, the control circuit 110 may include or access a memory (such as those described below), which may have instructions, code, or software usable for assessing the vehicular cargo capacity of delivery vehicles. By yet another approach, the database(s) 116 may include program code or software that assists in determining available cargo capacity for multiple vehicles, in accordance with some embodiments. For example, the control circuits 110, invoking one or more programs, can determine the available cargo capacity of a particular cargo space 124 by accessing one or more of the vehicle databases 116 and comparing the associated spatial data generated by the vehicle cargo space sensors 122 with the theoretical spatial data associated with the cargo space 124 (i.e., manufacturer supplied spatial data). In yet another configuration, the control circuit 110 (potentially along with one or more programs from the memory or databases) may use the data generated by the vehicle cargo space sensors 122 that may be stored in the vehicle database 116, to determine the available cargo capacity of a particular cargo space without reference to manufactured, theoretical, or other data. In this manner, the control circuit 110 can assess the cargo capacity of a given delivery vehicle 120 primarily based on the vehicle cargo space sensor 122 readings.

In one illustrative approach, the control circuits 110, invoking one or more programs, can instruct the vehicle cargo space sensors 122 to capture instant spatial data for one or more particular cargo spaces 124 and determine the volumetric differences between the captured spatial data and the associated theoretical spatial data to determine the available cargo space of the associated cargo spaces 124. In some embodiments, the control circuits 110 are configured to determine available cargo space using captured spatial data without making a comparison with the theoretical spatial data.

In certain embodiments, the control circuit 110 is configured to access the one or more databases 118, ascertain the commercial products included for a particular purchase order (along with the associated weights, volumes, climatic requirements, and/or geometric configurations of the commercial products in a purchased order), and select one or more delivery vehicles 120 having available cargo space compatible with the determined commercial products in the particular purchase order. For example, the control circuit 110 in one illustrative approach, is configured to access the one or more databases 118 and select one or more delivery vehicles 120 having the required cargo space for delivery of the particular purchase order. Accordingly, the control circuit 110 may assess the available cargo space for delivery vehicles, such as by analyzing available spatial data and climatic data, which can then be compared with requirements of the purchase order, such as the weight, volume, climate, and/or geometric configuration requirements of all or a portion of the particular purchase order. Subsequent to the selection of compatible delivery vehicles 120, the control circuits 110, in one illustrative approach, is configured to present one or more of the selected delivery vehicles 120 a delivery opportunity. The presentation of the delivery opportunity, may include details of the order, such as the shipping destination, timing, one or more of the commercial products in the purchase order, among other information. By one approach, the delivery opportunity may be presented via the delivery agent interface 142 to a potential delivery agent. By another approach, the control circuit 110 may present delivery options to a customer or shopper via the shopping user interface 152. Additionally, or alternatively, the control circuit 110, in one configuration, updates delivery opportunities presented to delivery agents when the control circuits 110 detects an updated requested delivery time or a selection of the delivery options by a customer or shopper.

Additionally, or alternatively, the control circuit 110, in one illustrative configuration, accesses the one or more databases 118, compares the cargo spaces 124 of the selected delivery vehicles 120 to dimensions of the commercial products of the particular purchase order, and determines an optimized storage orientation for the commercial products in the particular purchased order within the available cargo spaces 124. For example, an optimized storage orientation allows for a maximum number of commercial products to be stored within one or more available cargo spaces, protects the items within the purchase order from damage during shipment or delivery, and/or retains items with a similar temperature with one another, among other potential considerations. In certain aspects, the control circuits 110 can utilize one or more images of the cargo space 124 captured by the vehicle cargo space sensors 122 (such as those capturing images of the cargo space 124) to determine the available capacity for a particular cargo space 124. For example, the control circuits 110 can use one or more object recognition techniques to determine the dimension and orientation of objects included in the captured images of a particular cargo space 124 and may compare the determined dimensions with the theoretical capacity of the cargo space 124 to determine the available capacity.

Additionally, or alternatively, upon determining that the cargo space 124 of a first delivery vehicle 120 is unsuitable to deliver the entirety of a purchased order (i.e., does not have sufficient available capacity, is not available, or the delivery agent did not accept a delivery opportunity), the control circuit 110, in one illustrative approach, can evaluate the cargo spaces 124 of other delivery vehicles 120 (as described above). Upon determining that one or more other cargo spaces 124 are suitable for delivery of the entirety of the purchased order, the control circuit 110 can present the associated delivery opportunity to the one or more other delivery vehicles 120 via the associated delivery agent interfaces 142. Similarly, upon determining that the one or more other cargo spaces 124 are suitable to deliver the purchased order in combination with the initial cargo spaces 124 of the first delivery vehicle 120, the control circuit 110 can present multiple delivery opportunities, one for each of the first delivery vehicle 120 and the one or more other delivery vehicles 120 via the associated delivery agent interfaces 142. In some embodiments, the control circuit 110 can cancel, reschedule, or split purchased orders if a shopping user elects, via shopping user interface 152, not to utilize a particular delivery vehicle 120 and if the shopper or customer has permitted such a delivery arrangement.

In yet another configuration, such as in situations where a particularly quick delivery is requested, the control circuit 110 may survey a plurality of delivery vehicles 120 to ascertain multiple delivery vehicles that are available for a delivery and meet the delivery requirements for the purchase order (e.g., cargo space available, climate controls, cost), and then present delivery opportunities to multiple delivery vehicles, via delivery agent interfaces 142. Accordingly, the control circuit 110, in one approach, assigns the delivery of the purchase order to the delivery agent who first accepts the delivery opportunity.

Figure 3:
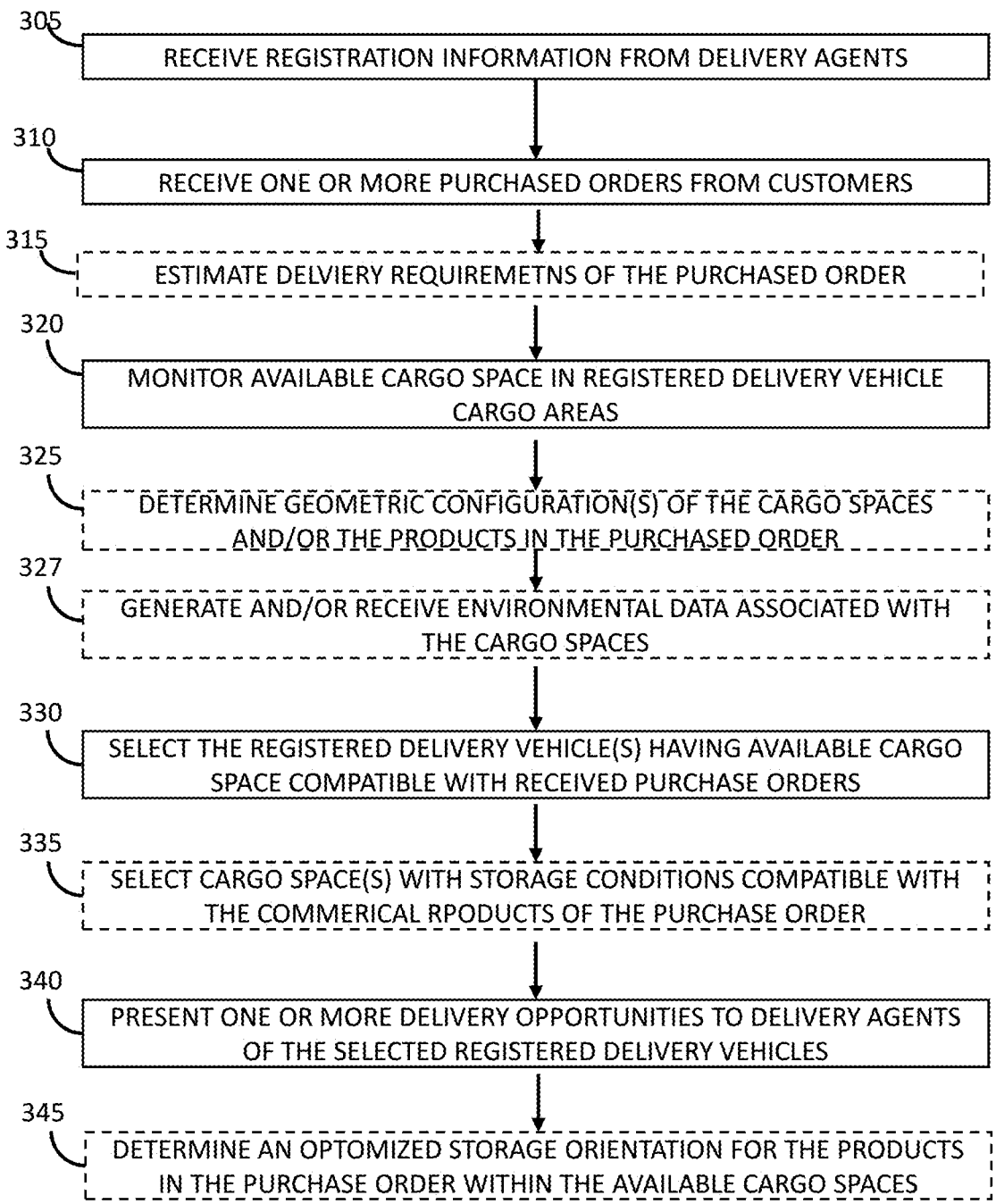
FIG. 3 is a flowchart of an exemplary process of assessing cargo capacity for multiple vehicles, in accordance with some embodiments.

FIG. 3 is a flowchart of an exemplary process of assessing delivery vehicles, such as by determining their available cargo capacity, in accordance with some embodiments. By one approach, the method 300 includes receiving 305 registration information from delivery agents. By one approach, the method 300 also includes receiving, at step 310, one or more purchased orders from customers. In step 315, the method 300, in one configuration, includes estimating the delivery requirements of the purchased order. The method 300 also includes monitoring 320 available cargo space in registered delivery vehicle cargo areas.

In addition, in some embodiments, the method includes determining 325 one or more geometric configurations of the cargo spaces and/or the products in the purchased order. In this manner, the method 300 may ascertain how to most effectively and efficiently transport the products in the available cargo space. In step 327, the method 300 may include generating 327 and/or receiving environmental data associated with the cargo spaces. In this manner, the cargo spaces may be evaluated for their fitness for transporting items requiring temperature or humidity controls.

The method 300, as illustrated in FIG. 3, also includes selecting 330 the registered delivery vehicles with available cargo space that is compatible with the products of a particular commercial order, which is the cargo space with sufficient unoccupied volume to accommodate the products in an order. Further, in step 335, the method may also include selecting the cargo spaces with storage conditions that are compatible with the commercial products of the purchase order, so that the delivery vehicle used for transporting the products can properly regulate the temperature and/or humidity of the cargo space. The method 300 also includes presenting 340 one or more delivery opportunities to the delivery agents of the selected delivery vehicles. In addition, the method may determine 345 an optimized storage or transit orientation for the products in the purchased order within the available cargo spaces. By one approach, this is facilitated, in part, by the geometric configurations of the cargo spaces and the products in the purchase order.

Figure 4:
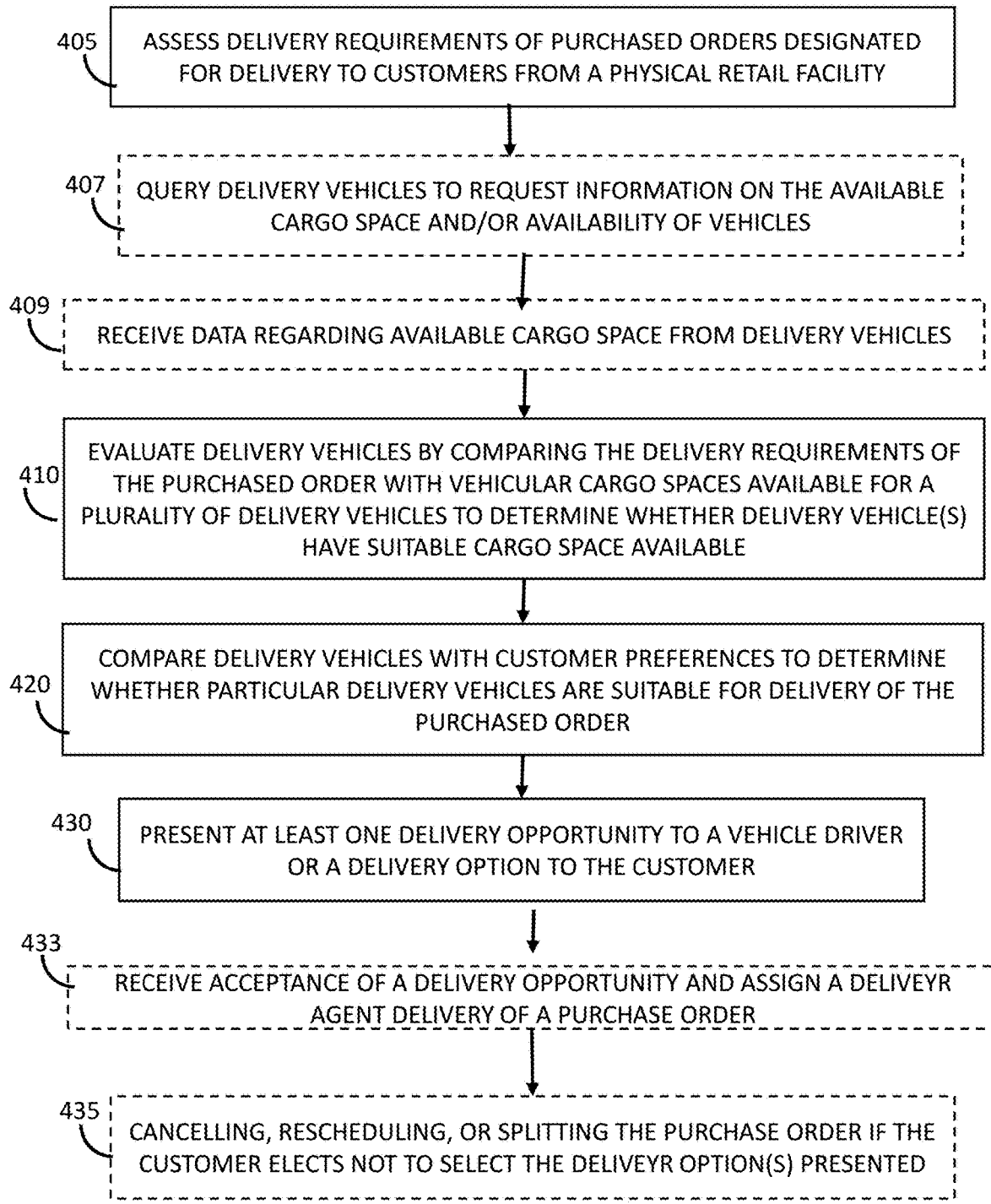
FIG. 4 is a flowchart of an exemplary process of determining alternative delivery vehicles from the driver's perspective, in accordance with several embodiments.

FIG. 4 is a flowchart of an exemplary process 400 of assessing delivery vehicles and, in some cases, determining alternative delivery vehicles. By one approach, the method 400 includes assessing 405 the delivery requirements of purchased orders designated for delivery to customers from a physical retail facility. By one approach, the method 400 includes querying 407 a number of delivery vehicles to request information on the available cargo space and/or the availability of the delivery vehicles themselves. In another aspect, the method 400 may include receiving 409 data regarding available cargo space from delivery vehicles, which may be in response to a request for information or this provision of data may be automated. As illustrated, the method 400 further includes evaluating 410 delivery vehicles by comparing the delivery requirements of purchased orders with the vehicular cargo spaces available for a plurality of delivery vehicles to determine whether one or more delivery vehicles has suitable cargo space available for the purchased order. This evaluation step also may include determining which of the vehicles with suitable cargo space is available at the time the customer is interested in having the products delivered.

In step 420, the method 300 compares delivery vehicles with customer preferences to determine whether particular delivery vehicles are suitable for delivery of the purchased order. For example, the comparison of the delivery vehicles and customer preferences may determine if the delivery vehicle has a temperature-controlled compartment for frozen foods, if the delivery vehicle is a non-smoking vehicle, if the delivery vehicle is an electric vehicle, and/or if the delivery vehicle is available for delivery of goods after a certain hour, among many other possible consumer preferences. After evaluating the delivery vehicles 410 and comparing the vehicles with customer preferences 420, the method 300 presents 430 at least one delivery opportunity to a delivery agent or a delivery option to the customer. In this manner, both the individual delivering the products and the customer or individual receiving the products may have an opportunity to approve the manner of delivery. Further, the method 400, in step 433, may include receiving an acceptance of a delivery opportunity and assigning a delivery agent delivery of a purchase order. By another approach, the method 400, step 435 may include cancelling, rescheduling, or splitting the purchase order, such as if the customer elects not to select the delivery options presented, if the delivery vehicle becomes unavailable, or if the products will no longer be capable of being shipped together, among other circumstances.

Figure 5:
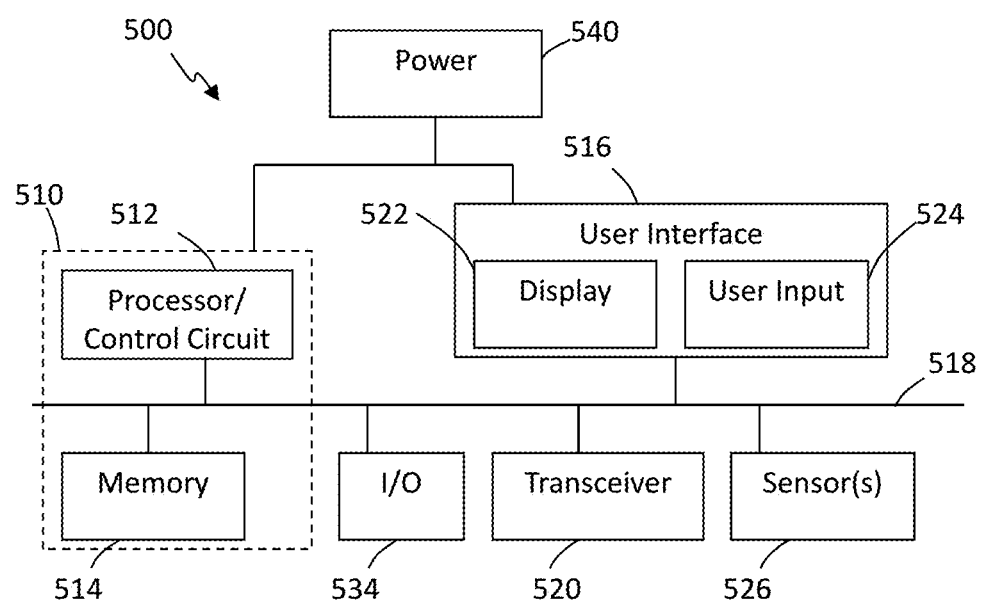
FIG. 5 illustrates an exemplary system for use in implementing methods, techniques, devices, apparatuses, systems, servers, sources and assessing delivery vehicles.

Further, the circuits, circuitry, systems, devices, processes, methods, techniques, functionality, services, servers, sources and the like described herein may be utilized, implemented and/or run on many different types of devices and/or systems. FIG. 5 illustrates an exemplary system 500 that may be used for implementing any of the components, circuits, circuitry, systems, functionality, apparatuses, processes, or devices of the computing devices, and/or other above- or below-mentioned systems or devices, or parts thereof. For example, the system 500 may be used to implement some or all of the computing device or the control circuit 110, the electronic user devices 140 and 150, one or more other control circuits and/or processing systems of the control circuit 110, one or more remote central control systems, and/or other such components, circuitry, functionality and/or devices. However, the use of the system 500 or any portion thereof is certainly not required.

By way of example, the system 500 may comprise a control circuit or processor module 512, memory 514, and one or more communication links, paths, buses or the like 518. Some embodiments may include one or more user interfaces 516, and/or one or more internal and/or external power sources or supplies 540. The control circuit 512 can be implemented through one or more processors, microprocessors, central processing unit, logic, local digital storage, firmware, software, and/or other control hardware and/or software, and may be used to execute or assist in executing the steps of the processes, methods, functionality and techniques described herein, and control various communications, decisions, programs, content, listings, services, interfaces, logging, reporting, etc. Further, in some embodiments, the control circuit 512 can be part of control circuitry and/or a control system 510, which may be implemented through one or more processors with access to one or more memory 514 that can store instructions, code and the like that is implemented by the control circuit and/or processors to implement intended functionality. In some applications, the control circuit and/or memory may be distributed over a communications network (e.g., LAN, WAN, Internet) providing distributed and/or redundant processing and functionality. Again, the system 500 may be used to implement one or more of the above or below, or parts of, components, circuits, systems, processes and the like.

The user interface 516 can allow a user to interact with the system 500 and receive information through the system. In some instances, the user interface 516 includes a display 522 and/or one or more user inputs 524, such as buttons, touch screen, track ball, keyboard, mouse, etc., which can be part of or wired or wirelessly coupled with the system 500. Typically, the system 500 further includes one or more communication interfaces, ports, transceivers 520 and the like allowing the system 500 to communicate over a communication bus, a distributed computer and/or communication network 130 (e.g., a local area network (LAN), the Internet, wide area network (WAN), etc.), communication link 518, other networks or communication channels with other devices and/or other such communications or combination of two or more of such communication methods.

Further, the transceiver 520 can be configured for wired, wireless, optical, fiber optical cable, satellite, or other such communication configurations or combinations of two or more of such communications. Some embodiments include one or more input/output (I/O) ports 534 that allow one or more devices to couple with the system 500. The I/O ports can be substantially any relevant port or combinations of ports, such as but not limited to USB, Ethernet, or other such ports. The I/O ports 534 can be configured to allow wired and/or wireless communication coupling to external components. For example, the I/O interface can provide wired communication and/or wireless communication (e.g., Wi-Fi, Bluetooth, cellular, RF, and/or other such wireless communication), and in some instances may include any known wired and/or wireless interfacing device, circuit and/or connecting device, such as but not limited to one or more transmitters, receivers, transceivers, or combination of two or more of such devices.

In some embodiments, the system may include one or more sensors 526 to provide information to the system and/or sensor information that is communicated to another component, such as the electronic user devices, a delivery vehicle, etc. The sensors can include substantially any relevant sensor, such as distance measurement sensors (e.g., optical units, sound/ultrasound units, etc.), cameras, motion sensors, inertial sensors, accelerometers, impact sensors, pressure sensors, and other such sensors. The foregoing examples are intended to be illustrative and are not intended to convey an exhaustive listing of all possible sensors. Instead, it will be understood that these teachings will accommodate sensing any of a wide variety of circumstances in a given application setting.

The system 500 comprises an example of a control and/or processor-based system with the control circuit 512. Again, the control circuit 512 can be implemented through one or more processors, controllers, central processing units, logic, software and the like. Further, in some implementations the control circuit 512 may provide multiprocessor functionality.

The memory 514, which can be accessed by the control circuit 512, typically includes one or more processor readable and/or computer readable media accessed by at least the control circuit 512, and can include volatile and/or nonvolatile media, such as RAM, ROM, EEPROM, flash memory and/or other memory technology. Further, the memory 514 is shown as internal to the control system 510; however, the memory 514 can be internal, external or a combination of internal and external memory. Similarly, some or all of the memory 514 can be internal, external or a combination of internal and external memory of the control circuit 512. The external memory can be substantially any relevant memory such as, but not limited to, solid-state storage devices or drives, hard drive, one or more of universal serial bus (USB) stick or drive, flash memory secure digital (SD) card, other memory cards, and other such memory or combinations of two or more of such memory, and some or all of the memory may be distributed at multiple locations over the computer network 130. The memory 514 can store code, software, executables, scripts, data, content, lists, programming, programs, log or history data, user information, customer information, product information, and the like. While FIG. 5 illustrates the various components being coupled together via a bus, it is understood that the various components may actually be coupled to the control circuit and/or one or more other components directly.

In some embodiments, systems are provided to determine available cargo capacity for multiple commercial product vehicles and include vehicles cargo space sensors may be positioned proximate to cargo spaces of registered commercial product delivery vehicles that have at least one cargo space. As used herein, the vehicle cargo space sensors are configured to monitor available cargo space that may be used to transport commercial products. In certain embodiments, the vehicle cargo space sensors are configured to emit and capture wireless signals to monitor available cargo spaces. The system also may include databases, which may each be communicatively coupled to the vehicle cargo space sensors, having a plurality of purchase orders that may each include at least one product with at least one product attribute associated therewith. The databases also may be configured to receive and store vehicle cargo space sensor data. The system also may include delivery user interfaces configured to operate on electronic user devices associated with delivery users. By one exemplary approach, one or more control circuits may be communicatively coupled to the databases, the delivery user interfaces, and the vehicle cargo space sensors. The control circuits generally receive registration information from the delivery agents via the delivery agent interfaces. The control circuits can use vehicle cargo space sensor data to select registered commercial product delivery vehicles that have the desired available cargo space for delivery of one or more purchased orders. The control circuits can use the delivery user interfaces to present delivery opportunities to delivery agent of the selected registered commercial product delivery vehicles.

In some embodiments, methods are provided for determining available cargo capacity for multiple commercial product vehicles. Some of these methods include receiving registration information from one or more delivery users via one or more delivery user interfaces and receiving one or more purchased orders each having commercial products requiring delivery thereof. By one approach, the method may include monitoring available cargo space within cargo spaces of registered commercial product delivery vehicles via vehicle cargo space sensors positioned proximate to the cargo spaces and configured to emit and capture wireless signals to monitor the available cargo space within the associated cargo spaces. In light of the information received, the method also may include selecting at least one registered commercial product delivery vehicle that has available cargo spaces for delivery of the commercial products of a particular purchase order and/or presenting a delivery opportunity to a delivery agent, user, or driver of the selected registered commercial product delivery vehicles.

In another exemplary approach, the system for assessing multiple commercial product delivery vehicles for fitness for delivery of a particular purchase orders (or portions thereof) includes a delivery agent interface operable on an electronic user device and a control circuit in communication with a plurality of electronic user devices and configured to estimate delivery requirements for a purchase order (such as the volumetric and geometric requirements of the items in the purchase order), evaluate a plurality of commercial product delivery vehicles to find one or more suitable options by comparing the delivery requirements with the available or unoccupied vehicular cargo space for particular commercial product delivery vehicles and at least one of customer preferences and availably of commercial product delivery vehicles, and present a delivery opportunity to a delivery agent. By assessing the availability of the commercial product delivery vehicles, the system may assess a commercial product delivery vehicle's currently available or unoccupied cargo space, any planned deliveries, the commercial product delivery vehicle's current distance from the pick-up locations, and/or traffic conditions that might delay arrival of the commercial product delivery vehicle at a pick-up or delivery location, among other considerations.

In another illustrative configuration, a system for assessing commercial product delivery vehicles may include a shopping user interface operable on a customer's electronic user device and a control circuit in communication therewith and the control circuit configured to estimate delivery requirements for a purchased order (such as the volumetric and geometric requirements of the items in the purchased order), evaluate commercial product delivery vehicles to find suitable options by comparing the delivery requirements with vehicular cargo space available for particular commercial product delivery vehicles, and present, via the electronic user device of the customer, a delivery option to the customer indicating based, in part, upon customer preferences and availability of the suitable commercial product delivery vehicles.

In yet another illustrative configuration, a system for assessing commercial product delivery vehicles may include a delivery agent interface, an order database with purchased orders stored therein, and a control circuit configured to estimate delivery requirements for a purchased order (such as the volumetric and geometric requirements of the items in the purchased order), query a plurality of commercial product delivery vehicles to determine vehicular cargo space available for each of the plurality of commercial product delivery vehicles and compare the delivery requirements with the cargo availability of particular commercial product delivery vehicles and the delivery requirements of at least one of the purchased orders in the order database, and present a delivery opportunity to a delivery agent to deliver at least a portion of the purchased order to a delivery location.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A system to assess alternative vehicles for product delivery, comprising:
   a delivery agent interface configured to:
      operate on an electronic user device associated with a crowdsourced delivery agent, the electronic user device configured to provide cargo availability data corresponding to an available vehicular cargo space of a vehicle associated with the crowdsourced delivery agent; and
      display at least a graphical icon or a visual indicator manipulatable by the crowdsourced delivery agent to indicate acceptance of a delivery opportunity presented by a control circuit, wherein the graphical icon or the visual indicator is displayed concurrently to electronic user devices associated with vehicles found suitable by the control circuit to facilitate a request for a quick delivery;
   the control circuit communicatively coupled to a plurality of electronic user devices via a corresponding delivery agent interface executed by a corresponding electronic user device of the plurality of electronic user devices when in communication with the control circuit, the control circuit is configured to:

estimate delivery requirements for a purchased order, the estimated delivery requirements including a volume requirement and a geometric configuration determined by physical aspects of the purchased order;

receive cargo availability data stored in a vehicle database and representative of currently available vehicular cargo space of a plurality of vehicles associated with crowdsourced delivery agents, the cargo availability data corresponding to a time following receipt of the purchased order and at a time the crowdsourced delivery agent would pick up and load items of the purchased order for delivery, wherein the plurality of vehicles associated with the crowdsourced delivery agents are variously owned, rented, leased, and of varying makes, models, manufacturer supplied cargo space capacities, and amounts of occupied cargo space capacities;

compare the estimated delivery requirements with the cargo availability data of the plurality of vehicles associated with the crowdsourced delivery agents;

receive, from a sensor communicatively coupled to the control circuit, a location of each of the plurality of vehicles associated with the crowdsourced delivery agents;

evaluate the plurality of vehicles associated with the crowdsourced delivery agents to find one or more suitable vehicles of the plurality of vehicles associated with the crowdsourced delivery agents based on the comparison and at least one of the following: the location of each of the plurality of vehicles associated with the crowdsourced delivery agents, one or more customer preferences and availability of the plurality of vehicles associated with the crowdsourced delivery agents; and present the delivery opportunity to the electronic user devices associated with the one or more suitable vehicles in response to the evaluation such that the electronic user devices separately display the delivery opportunity and instruct the crowdsourced delivery agents to indicate the acceptance to deliver at least a portion of the purchased order to a delivery location, wherein the one or more customer preferences include at least one of cost preferences, vehicle preferences, delivery schedule preferences, willingness to split the purchased order into multiple deliveries, and environmental impact preferences, wherein the purchased order comprises a list of each item purchased and the system further comprises a product database of product attributes and wherein the control circuit is further configured to estimate the delivery requirements by accessing the product database to determine at least one of: a weight, the volume requirement, and the geometric configuration of purchased items, and wherein the delivery agent interface of the electronic user device associated with the crowdsourced delivery agent displays at least the graphical icon or the visual indicator manipulatable by the crowdsourced delivery agent to indicate the acceptance of the delivery opportunity presented by the control circuit, the crowdsourced delivery agent having a corresponding one of the one or more suitable vehicles and having been presented the delivery opportunity; and cargo space sensors comprising an image capturing device configured to capture images of vehicular cargo space; and in evaluating the plurality of vehicles, the control circuit is further configured to evaluate the plurality of vehicles using the captured images of the vehicular cargo space.

2. The system of claim 1, further comprising the sensor communicatively coupled to the control circuit, the sensor configured to report a location of a particular vehicle associated with the sensor substantially in real-time.

3. The system of claim 1, further comprising an order database comprising a plurality of purchase orders stored therein.

4. The system of claim 1, wherein the delivery agent interface is further configured to be provided to the electronic user devices by the control circuit.

5. The system of claim 1, wherein evaluating the plurality of vehicles comprises:
evaluating a cargo area of a primary vehicle;
upon a determination that the cargo area of the primary vehicle is unsuitable for delivery of an entirety of the purchased order, evaluating a secondary cargo area of a secondary vehicle;
upon a determination that the secondary cargo area is suitable for delivery of the entirety of the purchased order, the control circuit is configured to present the delivery opportunity to the secondary vehicle via the delivery agent interface; and
upon a determination that the secondary cargo area is suitable for delivery of the purchased order in combination with the cargo area of the primary vehicle, the control circuit is configured to present multiple delivery opportunities, one for each of the primary vehicle and the secondary vehicle via the delivery agent interfaces associated with the primary and secondary vehicles.

6. The system of claim 1, wherein the control circuit is further configured to cancel, reschedule, or split purchased orders if a customer elects not to utilize a particular vehicle.

7. The system of claim 1, further comprising a shopping user interface configured to operate on a second electronic user device associated with a customer, wherein the control circuit in communication with the second electronic user device is further configured to cause the second electronic user device to present to the customer a delivery option based, in part, on one or more customer preferences and availability of the one or more suitable vehicles.

8. The system of claim 7, wherein the control circuit is further configured to cause the second electronic user device to present multiple delivery options to the customer.

9. The system of claim 7, wherein the shopping user interface is at least one of: provided to the second electronic user device by the control circuit or executed by the second electronic user device when in communication with the control circuit.

10. The system of claim 7, wherein the control circuit is further configured to receive a requested delivery time and update the delivery option presented to the customer via the second electronic user device.

11. The system of claim 1, wherein the one or more customer preferences include at least one of the cost preferences, the vehicle preferences, timeline preferences, and willingness to split the purchased order into the multiple deliveries.

12. The system of claim 1, further comprising an order database having a plurality of purchase orders stored therein, wherein the control circuit is further configured to:

query a plurality of vehicles to determine the availability of the vehicular cargo space for each of the plurality of vehicles; and compare the delivery requirements with the available vehicular cargo space of particular vehicles and the delivery requirements of at least one of the plurality of purchase orders in the order database and thereby identify the one or more suitable vehicles.

13. The system of claim 1, wherein the delivery agent interface is further configured to facilitate crowdsourcing of the plurality of vehicles.

14. The system of claim 1, further comprising the vehicle database configured to store vehicle information, wherein the vehicle information comprises at least one of available and unoccupied cargo space.

15. A method to assess alternative vehicles for product delivery, comprising:

estimating, by a control circuit communicatively coupled to a plurality of first electronic user devices via a corresponding delivery agent interface executed by a corresponding electronic user device of the plurality of first electronic user devices when in communication with the control circuit, delivery requirements for a purchase order, the estimated delivery requirements including a volume requirement and a geometric configuration determined by physical aspects of the purchase order wherein each of the plurality of first electronic user devices is operable by a crowdsourced delivery agent, the first electronic user device configured to provide cargo availability data corresponding to an available vehicular cargo space of a vehicle associated with the crowdsourced delivery agent;

receiving, by the control circuit, cargo availability data stored in a vehicle database and representative of currently available vehicular cargo space of a plurality of vehicles, the cargo availability data corresponding to a time following receipt of the purchase order and at a time the crowdsourced delivery agent would pick up and load items of the purchased order for delivery, wherein the plurality of vehicles associated with crowdsourced delivery agents are variously owned, rented, leased, and of varying makes, models, manufacturer supplied cargo space capacities, and amounts of occupied cargo space capacities;

comparing, by the control circuit, the estimated delivery requirements with the cargo availability data of the plurality of vehicles associated with the crowdsourced delivery agents;

receiving, from a sensor communicatively coupled to the control circuit, a location of each of the plurality of vehicles associated with the crowdsourced delivery agents;

evaluating, by the control circuit, the plurality of vehicles associated with the crowdsourced delivery agents to find one or more suitable vehicles of the plurality of vehicles associated with the crowdsourced delivery agents based on the comparison and at least one of: the location of each of the plurality of vehicles associated with the crowdsourced delivery agents, one or more customer preferences and availability of the plurality of vehicles associated with the crowdsourced delivery agents;

presenting, by the control circuit, a delivery opportunity to corresponding first electronic user devices associated with the one or more suitable vehicles in response to the evaluation such that the corresponding first electronic user devices separately display the delivery opportunity and instruct the crowdsourced delivery agents to indicate acceptance to deliver at least a portion of the purchase order to a delivery location, wherein the one or more customer preferences include at least one of cost preferences, vehicle preferences, delivery schedule preferences, willingness to split the purchased order into multiple deliveries, and environmental impact preferences, and wherein the purchased order comprises a list of each item purchased and the system further comprises a product database of product attributes and wherein the control circuit is further configured to estimate the delivery requirements by accessing the product database to determine at least one of: a weight, the volume requirement, and the geometric configuration of purchased items;

displaying, via the corresponding delivery agent interface of the corresponding electronic user device associated with a corresponding crowdsourced delivery agent, at least a graphical icon or a visual indicator manipulatable by the crowdsourced delivery agent to indicate acceptance of the delivery opportunity presented by the control circuit, the crowdsourced delivery agent having a corresponding one of the one or more suitable vehicles and having been presented the delivery opportunity, wherein the graphical icon or the visual indicator is displayed concurrently to electronic user devices associated with vehicles found suitable by the control circuit to facilitate a request for a quick delivery;

capturing, by cargo space sensors comprising an image capturing device, images of vehicular cargo space; and in evaluating the plurality of vehicles, evaluating, by the control circuit, the plurality of vehicles using the images of the vehicular cargo space captured by the cargo space sensors.

16. The method of claim 15, further comprising:

receiving, by the control circuit, a requested delivery time and update a delivery option presented to a customer via a second electronic user device associated with the customer;

updating, by the control circuit, the delivery option presented to the customer via the second electronic user device.

17. The method of claim 16, further comprising cancelling, rescheduling, or splitting, by the control circuit, the purchase order if the customer elects not to utilize a particular vehicle.

* * * * *